(12) United States Patent
Laban et al.

(10) Patent No.: US 11,548,575 B2
(45) Date of Patent: Jan. 10, 2023

(54) RETAINER FOR EQUALIZER BAR PIN AND SYSTEMS AND ASSEMBLIES THEREOF

(71) Applicant: Caterpillar Inc., Deerfield, IL (US)

(72) Inventors: Christopher S. Laban, East Peoria, IL (US); Florentin Tatarus, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 877 days.

(21) Appl. No.: 16/442,806

(22) Filed: Jun. 17, 2019

(65) Prior Publication Data

US 2020/0391813 A1    Dec. 17, 2020

(51) Int. Cl.
*B62D 55/084*    (2006.01)
(52) U.S. Cl.
CPC .............. *B62D 55/0842* (2013.01)
(58) Field of Classification Search
CPC ............ B62D 55/0842; Y10T 403/32893
See application file for complete search history.

(56) References Cited

U.S. PATENT DOCUMENTS

| | | | |
|---|---|---|---|
| 2,654,614 A | 10/1953 | Murphy | |
| 3,171,294 A | 3/1965 | Mazzarins | |
| 3,464,512 A * | 9/1969 | Schaffner | B62D 55/0842 180/9.54 |
| 3,679,196 A | 7/1972 | Royer | |
| 3,825,088 A * | 7/1974 | Copeland | B62D 55/0842 180/9.5 |
| 3,910,367 A * | 10/1975 | Drone | B60G 9/02 180/9.5 |
| 4,781,257 A | 11/1988 | Gee et al. | |
| 2018/0029652 A1 * | 2/2018 | Loganathan | B60G 9/04 |

* cited by examiner

*Primary Examiner* — S. Joseph Morano
*Assistant Examiner* — Emily G. Castonguay
(74) *Attorney, Agent, or Firm* — Xsensus LLC

(57) ABSTRACT

A retainer plate configured to retain a center pin for an equalizer bar comprises a first face and a second face opposite the first face; a first support arm having a first reduced contact portion; a second support arm having a second reduced contact portion; and a neck portion between the first support arm and the second support arm. The retainer plate can be symmetrical about a center vertical axis in an end view thereof, and the first support arm, the second support arm, and the neck portion can define a central concave recess configured to receive the center pin via an opening into the central concave recess defined between the first support arm and the second support arm. The first support arm can have a first set of openings through a thickness of the retainer plate and configured to receive respective fasteners therethrough, and the second support arm can have a second set of openings through the thickness of the retainer plate and configured to receive respective fasteners therethrough.

20 Claims, 5 Drawing Sheets

RETAINER FOR EQUALIZER BAR PIN AND SYSTEMS AND ASSEMBLIES THEREOF

TECHNICAL FIELD

The present disclosure relates to retainers for equalizer bars, and more particularly to retainers configured to retain center pins of equalizer bars.

BACKGROUND

A center pin in a joint of an equalizer bar may be retained using two distinct, separated retainer plates, each with two bolts that may attach to the rear surface of a main frame saddle casting. However, movement of the center pin can create bolt overloading, which may lead to bolt failure in terms of loosening and/or fracturing of one or more of the bolts.

U.S. Pat. No. 3,679,196 ("the '196 patent") describes a pair of support pad structures each that includes a U-shaped heat treated spring metal member centrally positioned in the support pad structure for receiving one of the tubular projections between the legs thereof, and having the opposed legs thereof bonded to an elastomeric material. According to the '196 patent, the support pad structure further includes a pair of L-shaped retainer plates, which are also constructed of heat treated spring metal and which each have one leg bonded to the elastomeric material, and a horizontally leg which projects to one side of the support pad structure and has an aperture formed therein for receiving a retaining bolt. The '196 patent also describes that the support pad structure includes a pair of vertically extending columns at the laterally outer extremities of the support pad structure. However, the '196 patent does not describe that the support pad structure is a single unitary plate that has a face coupled to a saddle and that is configured to engage with a center pin in a joint of an equalizer bar to restrict movement of the center pin.

SUMMARY OF THE DISCLOSURE

In one aspect, the present disclosure provides a retainer plate configured to retain a center pin for an equalizer bar. The retainer plate can comprise: a first face and a second face opposite the first face; a first support arm having a first reduced contact portion; a second support arm having a second reduced contact portion; and a neck portion between the first support arm and the second support arm. The retainer plate can be symmetrical about a center vertical axis in an end view thereof, and the first support arm, the second support arm, and the neck portion can define a central concave recess configured to receive the center pin via an opening into the central concave recess defined between the first support arm and the second support arm. The first support arm can have a first set of openings through a thickness of the retainer plate and configured to receive respective fasteners therethrough, and the second support arm can have a second set of openings through the thickness of the retainer plate and configured to receive respective fasteners therethrough.

In another aspect, a retaining assembly for a working machine can be provided or implemented. The retaining assembly can comprise: a center pin for an equalizer bar of the working machine; and a single unitary retainer plate configured to retain the center pin. The center pin can have a body with a first end and a second end opposite the first end, a sidewall between the first and second ends, a first slot in the sidewall adjacent to the first end, and a second slot in the sidewall opposite the first slot and adjacent to the first end. The single unitary retainer plate can be symmetrical about a center vertical axis in an end view of the retaining assembly and can include: a first face and a second face opposite the first face, a first support arm having a first reduced contact portion and a first projection, a second support arm having a second reduced contact portion and a second projection, and an arcuate neck portion between the first support arm and the second support arm. The first support arm, the second support arm, and the arcuate neck portion can define a central concave recess configured to receive the center pin via an opening into the central concave recess defined between the first projection and the second projection, the single unitary retainer plate can have a length greater than a height, the first support arm can have a first set of openings configured to receive respective bolts therethrough, and the second support arm has a second set of openings configured to receive respective bolts therethrough. The single unitary retainer plate is configured to retain the center pin such that an inner surface of the arcuate neck portion defining the central concave recess is provided adjacent to a first portion of the sidewall, a second portion of the sidewall opposite the first portion is exposed via the opening into the central concave recess, the first reduced contact portion extends into the first slot in the sidewall, and the second reduced contact portion extends into the second slot in the sidewall.

Other features and aspects of this disclosure will be apparent from the following description and the accompanying drawings.

DETAILED DESCRIPTION

The present disclosure relates to retainers configured to retain center pins of equalizer bars, and systems and assemblies thereof.

Figure 1:
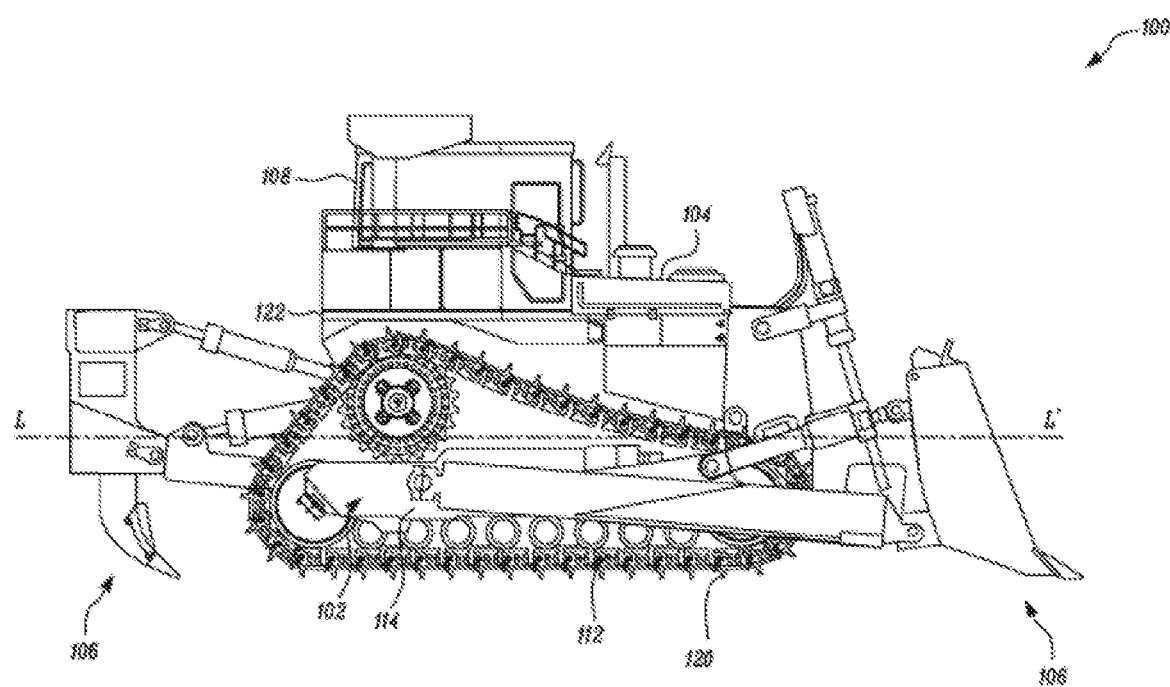
FIG. 1 illustrates a side view of a machine according to embodiments of the disclosed subject matter.

FIG. 1 illustrates an exemplary machine 100 that can implement a retainer in accordance with one or more embodiments of the present disclosure. The machine 100 can define a longitudinal axis LL'. The machine 100 may include a track-type machine or a wheel-type machine. The machine 100 may include loaders, compactors, dozers, excavators, or any other suitable machine. The machine 100 may be an earth moving machine, a construction machine, a mining machine, an agricultural machine, a forest machine, etc. In the illustrated embodiment, the machine 100 is a dozer. However, those skilled in the art would appreciate that the scope of the disclosure is not limited to the machine 100 as the dozer.

Figure 2:
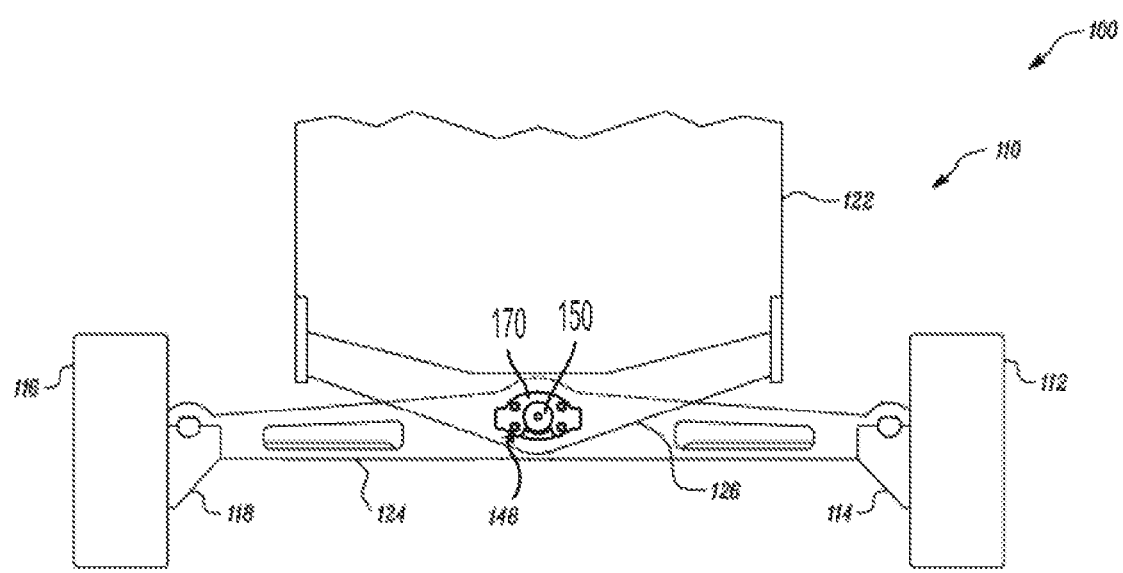
FIG. 2 illustrates a front view of a retaining assembly of the machine of FIG. 1 according to embodiments of the disclosed subject matter.

Referring to FIGS. 1 and 2, the machine 100 can include an undercarriage 102, an engine 104, at least one implement 106, an operator station 108, an assembly 110, and a main frame 122. The undercarriage 102 may include a first track 112 supported on a first track frame 114, and a second track 116 supported on a second track frame 118. The first track 112 and the second track 116 may include a plurality of track shoes 120. The first track 112 and the second track 116 can facilitate movement of the machine 100.

For moving the machine 100, the first track 112 and the second track 116 can be powered by the engine 104. The engine 104 may be a heat engine, or any other source generating power. The engine 104 may include a spark ignited engine, a compression ignited engine, etc. In an embodiment, the engine 104 may be a two stroke engine, a four stroke engine, a six stroke engine, etc.

The engine 104 can also provide power to various auxiliary equipment of the machine 100, including the implement(s) 106 for performing work. The implement 106 may be a blade, a bucket, a ripper, a hammer, a grapple or any other suitable implement. A single implement or multiple implements may be attached to machine 100 for performing desired work. In the illustrated embodiment, two implements are attached to the machine 100. One implement 106 is a blade attached at a front of the machine 100, while the other implement is a ripper attached to a rear of the machine 100.

The engine 104 and all other components of the machine 100 can be controlled from the operator station 108, such as by an operator stationed within the operator station 108. The operator station 108 may include a control panel (not shown) for operating the machine 100. The control panel may enable the operator of the machine 100 to control various functionalities of the machine 100. The control panel may include physical controls/levers and/or touchscreens. The operator station 108, the engine 104, the undercarriage 102, and the implement 106 can be coupled to and supported by the assembly 110.

Referring to FIG. 2, the assembly 110 can include an equalizer bar 124, which can be positioned transverse of the machine 100, a center pin 150, and an arrangement 148. According to one or more embodiments, the arrangement 148 itself may be considered as a separate assembly or a subassembly of assembly 110.

A saddle 126 can be provided and may be considered part of the main frame 122. The saddle 126 can extend transverse of the machine 100 and laterally relative to the main frame 122. The equalizer bar 124 can be coupled (e.g., pivotably coupled) to the saddle 126 by the arrangement 148.

The arrangement 148 can include the center pin 150 and a retainer plate 170. The center pin 150 may be provided longitudinally or axially within aligned bores of the equalizer bar 124 and the saddle 126. As a non-limiting example, the center pin 150 can be from about two feet to about three feet in length and about five inches in diameter.

Figure 3:
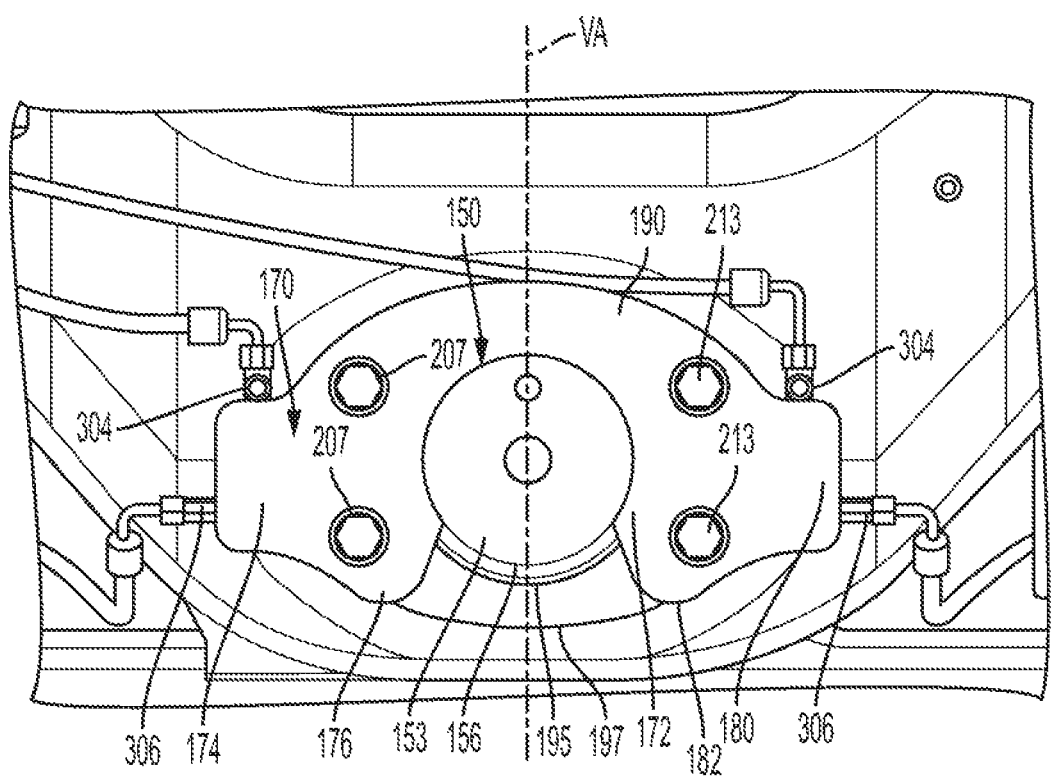
FIG. 3 is an enlarged front view of the retaining assembly of FIG. 2.
Figure 4:
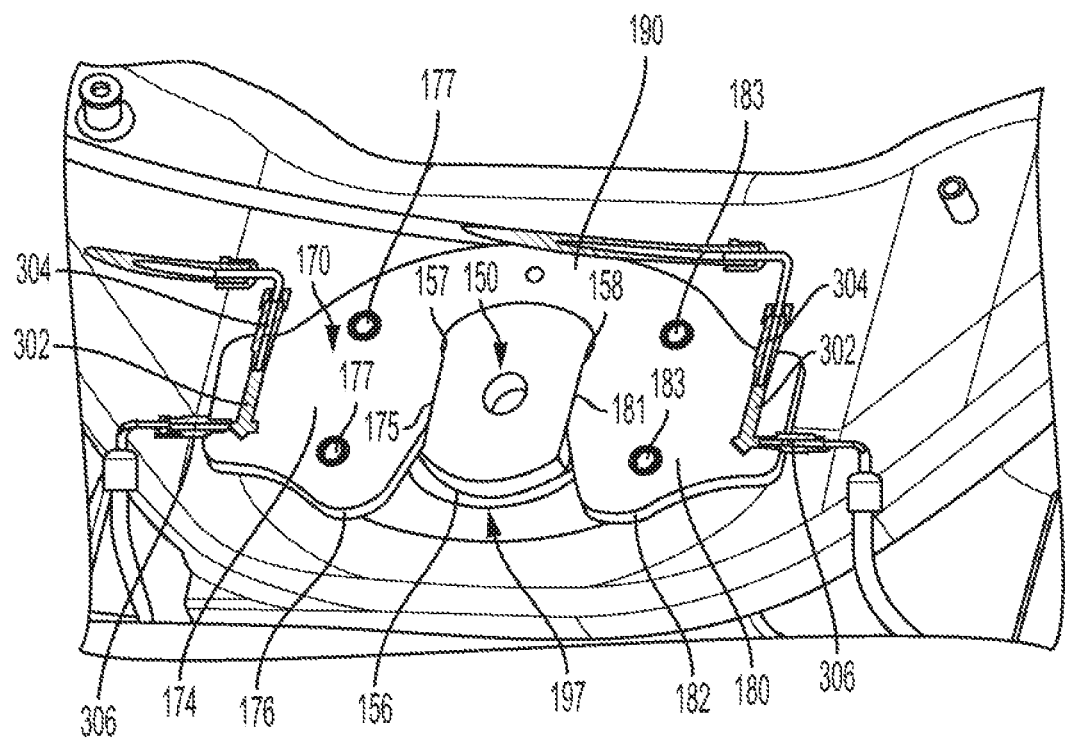
FIG. 4 is a sectional view of the retaining assembly of FIG. 3.
Figure 5:
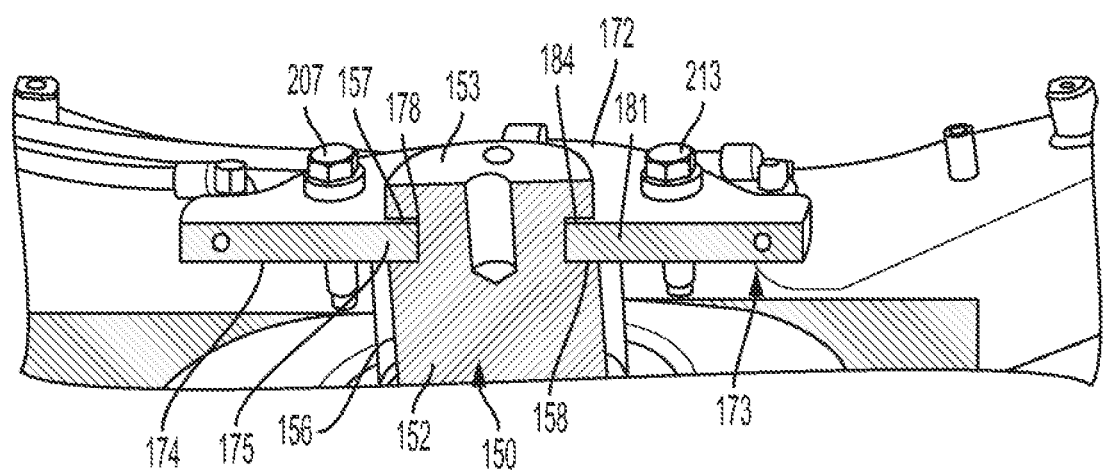
FIG. 5 is another sectional view of the retaining assembly of FIG. 3.

Shown in more detail in FIGS. 3-6, the center pin 150 can have a body 152 with a first end 153, a second end (not expressly shown) opposite the first end 153, and a sidewall 156 between the first and second ends. The sidewall 156 can define a first slot 157 and a second slot 158. The first slot 157 and the second slot 158 can be adjacent to the first end 153 of the center pin 150. For example, as shown in FIG. 5, the first slot 157 and the second slot 158 can be offset in a longitudinal or axial direction from the first end 153. Incidentally, the first end 153 of the center pin 150 can include one or more machining-related features, such as the circular openings shown in FIG. 3.

As shown in FIGS. 4 and 5, for instance, the first slot 157 can be opposite the second slot 158 (i.e., 180 degrees offset). Additionally, the first slot 157 and the second slot 158 can have the same or substantially the same configuration (i.e., dimensions). Moreover, the first slot 157 and the second slot 158 can be offset in the longitudinal or axial direction from the first end 153 by a same amount.

The retainer plate 170 can have a first face 172, a second face 173 opposite the first face 172, a first support arm 174, a second support arm 180, and a neck portion 190. As shown in FIG. 3, the retainer plate 170 can be symmetrical about a center vertical axis VA, for instance, in an end or face view of the retainer plate 170 or an end view of the assembly 110. The center vertical axis VA may also run through the center of the center pin 150. Optionally, the retainer plate 170 may have a length greater than a height, where length and height are defined in at least FIGS. 3 and 6 horizontally and vertically, respectively. Put another way, the first face 172 and the second face 173, which may be mirror images of each other, can each have a length thereof greater than a height thereof.

The retainer plate 170 may be a single unitary retainer plate in that the first support arm 174, the second support arm 180, and the neck portion 190 can be formed in one-piece instead of separate pieces coupled together (e.g., mechanically coupled together). Of course, the retainer plate 170, even if considered to be a single unitary retainer plate, can, according to embodiments, be formed of multiple layers that build up the thickness of the single unitary retainer plate but without creating distinct first support arm 174, second support arm 180, and neck portion 190 that would still need to be coupled together. Optionally, the retainer plate 170 may be made of a metal, such as iron or steel.

The neck portion 190, as shown, can be between the first support arm 174 and the second support arm 180. Thus, the neck portion 190 may connect the first support arm 174 to the second support arm 180. Moreover, the neck portion 190 may be curved or arcuate, such as shown in FIGS. 3-6, which shows the neck portion 190 having arcuate inner and outer surfaces. Alternatively, the inner surface may be curved and the outer surface may be linear, at least in part, over where the neck portion 190 is adjacent to the center pin 150. According to one or more embodiments, a portion of the neck portion 190 at the center vertical axis VA can have a smallest height of the retainer plate 170. For instance, the neck portion 190 may be smallest in height at the center vertical axis VA and increase in height in both directions toward the first support arm 174 and the second support arm 180.

The first support arm 174 can have a first reduced contact portion 175 and a first projection 176. As shown in FIG. 4, the first support arm 174 can also have a first set of openings 177 that can extend through the retainer plate 170 from the first face 172 to the second face 173. Similarly, the second support arm 180 can have a second reduced contact portion 181 and a second projection 182. And as shown in FIG. 4, the second support arm 180 can have a second set of openings 183 that can extend through the retainer plate 170 from the first face 172 to the second face 173. Each first opening 177 may be configured to receive a first fastener 207, and each second opening 183 may be configured to receive a second fastener 213. The first fastener 207 and the second fastener 213 may be the same fastener configuration, such as a threaded bolt and washer configuration shown in the figures. The first fastener 207 and the second fastener 213 can extend through the retainer plate 170 and removably engage with the saddle 126.

Optionally, in one or more embodiments, the first support arm 174 may have only two first openings 177 and the second support arm 180 may have only two second openings 183. Alternatively, the first support arm 174 may have more than two first openings 177, such as three, and the second support arm 180 may have more than two second openings 183, such as three. Thus, according to embodiments, the first support arm 174 and the second support arm 180 may have the same amount of first openings 177 as second openings 183. Moreover, the first openings 177 and the second openings 183 may be symmetrical or mirror images of each other in terms of arrangement, configuration, etc. on the first support arm 174 and the second support arm 180, respectively.

As shown in FIG. 3, the first openings 177 can be vertically aligned with each other, and the second openings 183 can be vertically aligned with each other in an end or face view of the retainer plate 170. Moreover, the upper-most openings of the first openings 177 and the second openings 183, i.e., those adjacent the neck portion 190, can be horizontally aligned with each other. Additionally or alternatively, the lower-most openings of the first openings 177 and the second openings 183 can be vertically aligned with each other.

Figure 6:
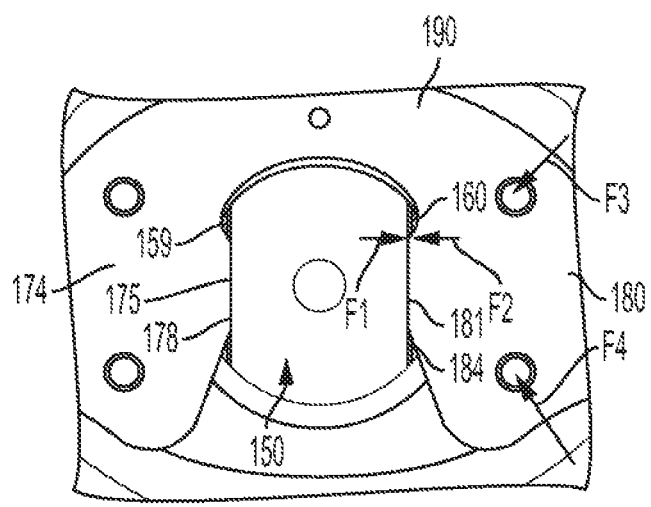
FIG. 6 is a sectional view of FIG. 3 showing exemplary forces associated with retaining assemblies according to embodiments of the disclosed subject matter.

Notably, as particularly shown in FIG. 6, the upper-most openings can be arranged such that each is at a height of the retainer plate 170 entirely above a height of the first reduced contact portion 175 and the second reduced contact portion 181 on the retainer plate 170. Put another way, an imaginary horizontal line through any portion of one or both of the upper-most openings can be vertically above an imaginary horizontal line through any portion of the first reduced contact portion 175 and/or the second reduced contact portion 181. Likewise, the lower-most openings can be arranged such that each is at a height of the retainer plate 170 entirely below the first reduced contact portion 175 and the second reduced contact portion 181 on the retainer plate 170. Put another way, an imaginary horizontal line through any portion of one or both of the lower-most openings can be vertically below an imaginary horizontal line through any portion of the first reduced contact portion 175 and/or the second reduced contact portion 181.

The first reduced contact portion 175 and the second reduced contact portion 181 can face radially inward toward each other. Additionally, the first reduced contact portion 175 and the second reduced contact portion 181 can have configurations (i.e., dimensions, shape, etc.) based on receipt thereof in the first slot 157 and the second slot 158, respectively. For instance, the first reduced contact portion 175 can have a first contact surface 178, and the second reduced contact portion 181 can have a second contact surface 184. As a non-limiting example, each of the first contact surface 178 and the second contact surface 184 can be flat, and the first contact surface 178 and the second contact surface 184 can be parallel to each other, such as shown in FIG. 6.

Also as shown in FIG. 6, the first contact surface 178 can be provided adjacent to or in contact with a first base portion 159 of the center pin 150 defined by the first slot 157. Likewise, the second contact surface 184 can be provided adjacent to or in contact with a second base portion 160 of the center pin 150 defined by the second slot 158. The first reduced contact portion 175 and the second reduced contact portion 181 may be viewed as contact portions that have been reduced in length (in the height direction of the retainer plate 170) such that the length thereof is less than a length of the first base portion 159 and the second base portion 160, respectively. Thus, a moment of contact between the first reduced contact portion 175 and the first base portion 159 (and likewise the second reduced contact portion 181 and the second base portion 160) can be provided inward of the sidewall 156 of the center pin 150.

The first support arm 174, the second support arm 180, and the neck portion 190 can define a central concave recess 195 in the retainer plate 170. Moreover, access to the central concave recess 195 can be via an opening 197 between the first projection 176 and the second projection 182. The opening 197 may be tapered between the first projection 176 and the second projection 182 to go from wide (e.g., widest) to narrow at the first reduced contact portion 175 and the second reduced contact portion 181.

As shown, the center pin 150 may be provided in the central concave recess 195. In one or more embodiments, an inner surface of the neck portion 190 that defines the central concave recess 195 can have a same curvature as a curvature of the center pin 150 in the end view of the assembly 110.

The retainer plate 170 can retain the center pin 150 such that an inner surface of the neck portion 190 defining the central concave recess 195 is provided adjacent to a first portion of a sidewall of the center pin 150, a second portion of the sidewall opposite the first portion is exposed via the opening 197 into the central concave recess 195, the first reduced contact portion 175 extends into the first slot 157, and the second reduced contact portion 181 extends into the second slot 158. As shown by FIG. 5, when the center pin 150 is retained by the retainer plate 170, the first end 153 of the center pin 150 can extend from the retainer plate 170. Additionally, according to embodiments, the center pin 150 can be circular and overlap the first and second reduced contact portions 175, 181, such as shown in FIG. 3.

Optionally, the retainer plate 170 can have one or more channels 302. The channel(s) 302 may be provided inside the first support arm 174 and/or the second support arm 180. FIG. 4, for instance, shows one channel 302 provided internally in each of the first support arm 174 and the second support arm 180. Each channel 302 can have at opposite ends a first port 304 and a second port 306. As shown, each first port 304 and each second port 306 may be provided in a side surface (e.g., side surface portions) of the retainer plate 170, particularly side surface(s) of the first support arm 174 and the second support arm 180. Each internal channel 302 can be configured to allow lubricant (e.g., grease) to pass therethrough from the first port 304 to the second port 306 or vice versa from a lubrication system.

INDUSTRIAL APPLICABILITY

The present disclosure relates to retainers configured to retain center pins of equalizer bars, and systems and assemblies thereof.

According to embodiments, a retainer plate, such as retainer plate 170, can be provided in wrap around fashion to retain a center pin, such as center pin 150. As shown in the figures, the retainer plate 170 can wrap around at least a top half of the center pin 150, leaving open or exposed a bottom portion of the center pin 150.

The retainer plate 170 can be configured to retain the center pin 150. Retaining in this context can mean prohibiting or limiting movement of the center pin 150. Furthermore, such governed movement can be rotational movement of the center pin 150 and axial or longitudinal movement of the center pin 150.

The first support arm 174, the second support arm 180, and the neck portion 190 can define the central concave recess 195 in the retainer plate 170, and access to the central concave recess 195 can be via the opening 197 between the first support arm 174 and the second support arm 180. As noted above, the opening 197 may be tapered between the first projection 176 and the second projection 182 to go from wide (e.g., widest) to narrow at the first reduced contact portion 175 and the second reduced contact portion 181. Such tapering can allow the retainer plate 170 to be positioned (e.g., slid) into retaining position relative to the center pin 150.

As particularly shown in FIG. 6, the first contact surface 178 can be provided adjacent to or in contact with the first base portion 159 of the center pin 150 defined by the first slot 157, and the second contact surface 184 can be provided adjacent to or in contact with the second base portion 160 of the center pin 150 defined by the second slot 158. Such configuration can allow for rotational load of the center pin 150 to be transferred to the retainer plate 170 via the first contact surface 178 and the second contact surface 184. As noted above, the retainer plate 170 can also prohibit or limit axial or longitudinal movement of the center pin 150. In particular, an axial force of the center pin 150 can be translated from the internal sidewalls or faces of the first slot 157 and the second slot 158 to the first reduced contact portion 175 and the second reduced contact portion 181. Because the retainer plate 170 is fixedly coupled to the saddle 126, axial or longitudinal movement of the center pin 150 can be prohibited or limited and the load can be distributed among the first fasteners 207 and the second fasteners 213. In both cases, because the neck portion 190 connects the first support arm 174 and the second support arm 180, load(s) can be distributed between the first fasteners 207 and the second fasteners 213, as well as among the first fasteners 207 as a subset and among the second fasteners 213 as a subset.

FIG. 6 provides an example of a force F1 provided by a rotational force of the center pin 150 that produces a reactionary force F2 from the second contact surface 184. As shown diagrammatically, the load can be shared at the second fasteners 213 according to forces F3, F4. Such load sharing can be facilitated based on the configuration of the fastener locations on the retainer plate 170 relative to the geometry of the first contact surface 178 and the second contact surface 184 in terms of where these components contact the center pin 150, particularly the first base portion 159 and the second base portion 160, respectively. Moreover, though not expressly shown in FIG. 6, because the neck portion 190 connects the first support arm 174 and the second support arm 180 the load may also be distributed to one or more of the first fasteners 207 associated with the other support arm, in this case the first support arm 174.

The configuration and coupling of the retainer plate 170 according to embodiments of the disclosed subject matter can promote load sharing among all of the fasteners, such as first fasteners 207 and second fasteners 213, and may contribute to reduction in likelihood of failure of one or more of the fasteners.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A retaining assembly for a working machine comprising:
   a center pin for an equalizer bar of the working machine, the center pin having a body with a first end and a second end opposite the first end, a sidewall between the first and second ends, a first slot in the sidewall adjacent to the first end, and a second slot in the sidewall opposite the first slot and adjacent to the first end; and
   a single unitary retainer plate configured to retain the center pin,
   wherein the single unitary retainer plate is symmetrical about a center vertical axis in an end view of the retaining assembly and includes:
      a first face and a second face opposite the first face,
      a first support arm having a first reduced contact portion and a first projection,
      a second support arm having a second reduced contact portion and a second projection, and
      an arcuate neck portion between the first support arm and the second support arm,
   wherein the first support arm, the second support arm, and the arcuate neck portion define a central concave recess configured to receive the center pin via an opening into the central concave recess defined between the first projection and the second projection,
   wherein the single unitary retainer plate has a length greater than a height,
   wherein the first support arm has a first set of openings configured to receive respective bolts therethrough,
   wherein the second support arm has a second set of openings configured to receive respective bolts therethrough, and
   wherein the single unitary retainer plate is configured to retain the center pin such that an inner surface of the arcuate neck portion defining the central concave recess is provided adjacent to a first portion of the sidewall, a second portion of the sidewall opposite the first portion is exposed via the opening into the central concave recess, the first reduced contact portion extends into the first slot in the sidewall, and the second reduced contact portion extends into the second slot in the sidewall.

2. The retaining assembly according to claim 1, wherein, when the center pin is retained by the single unitary retainer plate, the first end of the center pin extends from the single unitary retainer plate.

3. The retaining assembly according to claim 1, wherein each of the first set of openings and the second set of openings consists of two openings.

4. The retaining assembly according to claim 3, wherein the first set of openings are vertically aligned and the second set of openings are vertically aligned.

5. The retaining assembly according to claim 1, wherein, in the end view of the retaining assembly:
   upper-most openings of the first and second sets of openings are horizontally aligned and are entirely vertically above the first and second reduced contact portions, and
   lower-most openings of the first and second sets of openings are horizontally aligned and are entirely vertically below the first and second reduced contact portions.

6. The retaining assembly according to claim 1, further comprising the respective bolts provided through the first set of openings and the respective bolts provided through the second set of openings, each of the bolts running through a thickness of the single unitary retainer plate and being configured to be received by a saddle for the equalizer bar.

7. The retaining assembly according to claim 1, wherein the single unitary retainer plate is configured to retain the center pin by governing rotational movement of the center pin and longitudinal movement of the center pin.

8. The retaining assembly according to claim 1, wherein the first end of the center pin is circular and overlaps the first and second reduced contact portions in the end view of the retaining assembly.

9. The retaining assembly according to claim 1,
wherein each of the first support arm and the second support arm includes an internal channel from a first port at a first side surface of the first or second support arm to a second port at a second side surface of the first or second support arm, and
wherein each of the internal channels is configured to pass therethrough lubricant for lubrication lines.

10. A retainer plate configured to retain a center pin for an equalizer bar comprising:
a first face and a second face opposite the first face;
a first support arm having a first reduced contact portion;
a second support arm having a second reduced contact portion; and
a neck portion between the first support arm and the second support arm,
wherein the retainer plate is symmetrical about a center vertical axis in an end view thereof,
wherein the first support arm, the second support arm, and the neck portion define a central concave recess configured to receive the center pin via an opening into the central concave recess defined between the first support arm and the second support arm,
wherein the first support arm has a first set of openings through a thickness of the retainer plate that are configured to receive respective first fasteners therethrough, and
wherein the second support arm has a second set of openings through the thickness of the retainer plate that are configured to receive respective second fasteners therethrough.

11. The retainer plate according to claim 10, wherein the first face and the second face each has a length greater than a height.

12. The retainer plate according to claim 10, wherein the retainer plate is configured to retain the center pin such that an inner surface of the neck portion defining the central concave recess is provided adjacent to a first portion of a sidewall of the center pin, a second portion of the sidewall opposite the first portion is exposed via the opening into the central concave recess, the first reduced contact portion extends into a first slot in the sidewall of the center pin, and the second reduced contact portion extends into a second slot in the sidewall of the center pin.

13. The retainer plate according to claim 10, wherein each of the first set of openings and the second set of openings consists of two openings.

14. The retainer plate according to claim 10, wherein, in the end view of the retainer plate:
upper-most openings of the first and second sets of openings are horizontally aligned and are entirely vertically above the first and second reduced contact portions, and
lower-most openings of the first and second sets of openings are horizontally aligned and are entirely vertically below the first and second reduced contact portions.

15. The retainer plate according to claim 10, wherein the first set of openings are vertically aligned and the second set of openings are vertically aligned in the end view of the retainer plate.

16. The retainer plate according to claim 10, wherein the retainer plate is configured to retain the center pin by restricting rotational movement of the center pin and axial movement of the center pin.

17. The retainer plate according to claim 10,
wherein each of the first support arm and the second support arm includes an internal channel from a first port at a first side surface of the first or second support arm to a second port at a second side surface of the first or second support arm, and
wherein each of the internal channels is configured to pass therethrough lubricant for lubrication lines.

18. The retainer plate according to claim 10, wherein the first reduced contact portion defines a first flat surface, and the second reduced contact portion defines a second flat surface, the first and second flat surfaces being parallel to each other.

19. The retainer plate according to claim 10, wherein an inner surface of the neck portion that defines the central concave recess has a same curvature as a curvature of the center pin in the end view of the retainer plate.

20. The retainer plate according to claim 10, wherein the neck portion is arcuate and a portion thereof at the center vertical axis has a smallest height of the retainer plate in the end view of the retainer plate.

* * * * *